United States Patent [19]

Larsen

[11] 3,730,977

[45] May 1, 1973

[54] COLOR CAMERA HAVING CAPACITANCE COMPENSATED INDEX STRIPS

[75] Inventor: Arthur Bertel Larsen, Colts Neck, N.J.

[73] Assignee: Bell Telephone Laboratories Incorporated, Murray Hill, N.J.

[22] Filed: Feb. 29, 1972

[21] Appl. No.: 230,344

[52] U.S. Cl. ....................178/5.4 ST

[51] Int. Cl. ....................H04n 9/06

[58] Field of Search ....................178/5.4 ST, 5.4 F

[56] References Cited

UNITED STATES PATENTS 2,657,331 10/1953 Parker ....................178/5.4 F 2,843,659 7/1958 James ....................178/5.4 ST 3,688,020 8/1972 Kubota ....................178/5.4 ST

*Primary Examiner*—Richard Murray

*Attorney*—R. J. Guenther

[57] ABSTRACT

Two sets of interdigitated conductive indexing strips are placed on the cathode side of a camera tube target onto which the scene is focused in color stripe sets. The conducting strips are dc biased to intercept part of the scanning electron beam and thereby provide an output current which serves to reference the beam position. The video target lead and one lead from each of the interdigitated indexing strip sets are connected respectively to the center tap and ends of a transformer primary. This interconnection acts to neutralize the capacitive coupling between the conductive strips and the target, which may be a high conductivity silicon target, thereby preventing coupling of the common frequency index and chrominance signals.

12 Claims, 4 Drawing Figures

COLOR CAMERA HAVING CAPACITANCE COMPENSATED INDEX STRIPS

BACKGROUND OF THE INVENTION

This invention relates to color television cameras, especially those having internally generated indexing capability, and more particularly, to an indexing arrangement suitable for camera tubes with high lateral conductivity targets.

One type of color camera utilizes color modulating gratings to spatially modulate the light from the object scene onto a single target plane in a series of color component stripes. Upon subsequent scanning of the target by an electron beam a composite video output signal comprising baseband and carrier portions is produced. The chrominance information of the scene is contained in the modulated carrier portion, but this chrominance carrier is the resultant of the contributions of the individual color stripes and since the camera tube has insufficient resolution to individually discern the fine spatial structure of the striped color pattern, only a single pair of parameters — amplitude and phase — can be extracted from the carrier. A reference signal is necessary to provide a phase datum in order to decode the phase information. In addition, the baseband signal amplitude is used as a third parameter to provide reconstruction of the desired color image.

Since the optically generated modulated chrominance carrier is converted into an electrical signal by a scanning process, the reference signal must be synchronized with the optically generated chrominance in order to be of any value in the decoding procedure. Even with the best of scanning techniques, the variations in sweep velocity create frequency fluctuations large enough to completely eliminate the possibility of extracting phase information by comparing the camera tube generated chrominance signal with any externally derived reference.

The only practical solution is to use the camera tube itself to generate along with the modulated chrominance carrier a reference signal which can be used to demodulate the color carrier. While variations in chrominance carrier frequency with sweep velocity may still occur, they will be matched by corresponding variations in reference frequency, and thus the phase difference between chrominance and reference carriers will be unaffected by the sweep velocity. There are two fundamental ways in which the reference signal can be obtained. First, by the addition of an optical reference pattern to the target input and second, by the addition of electrical sensing structures in the target itself.

The first type may utilize gaps in the striped color pattern on the target or alternatively an externally generated light pattern may be superimposed as an overlay to the color striped pattern, as is disclosed, for example, in a copending application of L. H. Enloe, Ser. No. 883,899, filed Dec. 10, 1969, and assigned to the assignee hereof. In the optically indexed systems using conventional tubes with photoconductive targets, such as vidicons or plumbicons, the chrominance and reference signals are detected together and brought out of the tube on a single target lead. Unless the signals are to be separated on an amplitude basis, the two must be at different frequencies, and while the frequency difference is usually large enough to permit separation by conventional bandpass filter techniques, the difference may be quite small, requiring the use of a comb filter.

The other type of indexing requires a specifically designated target in which a recurring series of conductive index strips or electrodes is positioned on the target. These strips act as sensors of electron beam position and they are connected in common to an external lead which provides the reference signal. This lead is distinct from the video signal lead which contains the combined chrominance and baseband signals.

This index strip arrangement has been used in a number of displays and cameras, but its application to camera tubes having certain types of targets, such as those having silicon diode array targets as described by M. H. Crowell and E. F. Labuda in "The Silicon Diode Array Camera Tube" Bell System Technical Journal, Vol. 48, No. 5, May-June, 1969, pages 1481–1528, produces a unique problem not experienced in displays or cameras of the conventional photoconductive target type. The substrate of the diode array target is composed of a unitary slab of silicon and has inherently high lateral conductivity. Because of the unitary substrate structure, the index strips must be overlayed on the substrate in distinction to being interspersed with target material, and as a result, capacitance between the target and the index strips is severely increased. The resultant capacitive coupling causes crosstalk between the reference and video signals and this crosstalk effectively precludes accurate decoding of the chrominance signal since the reference and chrominance signals are not independent.

In existing index type cameras and displays, the tubes conventionally used have segmented, low lateral conductivity targets and hence negligible index strip to target coupling. Accordingly, no substantial effort has been made to eliminate this effect in either camera or display apparatus. Furthermore, in the case of displays, what limited coupling there may be between the conductive strips and the environment is usually ignored since the reference signal is the only electrical output and there can therefore be no crosstalk between output signals. The coupling has no significant effect upon the device's principal output which is visible light generated by the display's phosphor action.

It is an object of the present invention to provide a reference signal for a color camera by means of electrode strip sensing. It is a further object to reduce crosstalk between the generated video and reference signals created by the capacitive coupling between the conductive index strips and the tube target.

SUMMARY OF THE INVENTION

In accordance with the present invention, a series of conducting index strips are placed on the camera target of a striped color grating tube and biased to intercept part of the electron beam when it scans the color modulated striped image on the target. The index strips are electrically interconnected to form two comb-like sets and each set is arranged in an interdigitated fashion with the other comb. All strips are parallel to each other and to the color grating stripes and are preferably equally spaced so that the interaction of the beam and the strips generates an index signal of the same frequency from each of the interdigitated combs and the fundamental components of these two index signals are 180° out of phase with respect to one another.

The conductive index combs form capacitors with the target substrate and if the target is of unitary construction and of high conductivity, as it would be if a silicon substrate were used, crosstalk will result between the index signals and the video signal. A transformer circuit is used to balance the index signals about the potential of the target substrate so that a reference signal is generated which is free from the crosstalk. This reference signal is then used as a phase datum for the chrominance decoding procedure.

. The balanced indexing technique is primarily useful in single tube cameras using unitary high conductivity target substrates. Hence, is especially valuable in camera systems incorporating diode array targets having silicon substrates since existing index systems designed for photoconductive target tubes, such as vidicons, do not function effectively with the silicon target. The technique may also find application in other cameras having solid state targets, including those having more than one tube.

BRIEF DESCRIPTION OF THE DRAWING

In the various figures like designations are used for identical or functionally identical elements.

DETAILED DESCRIPTION

Figure 1:
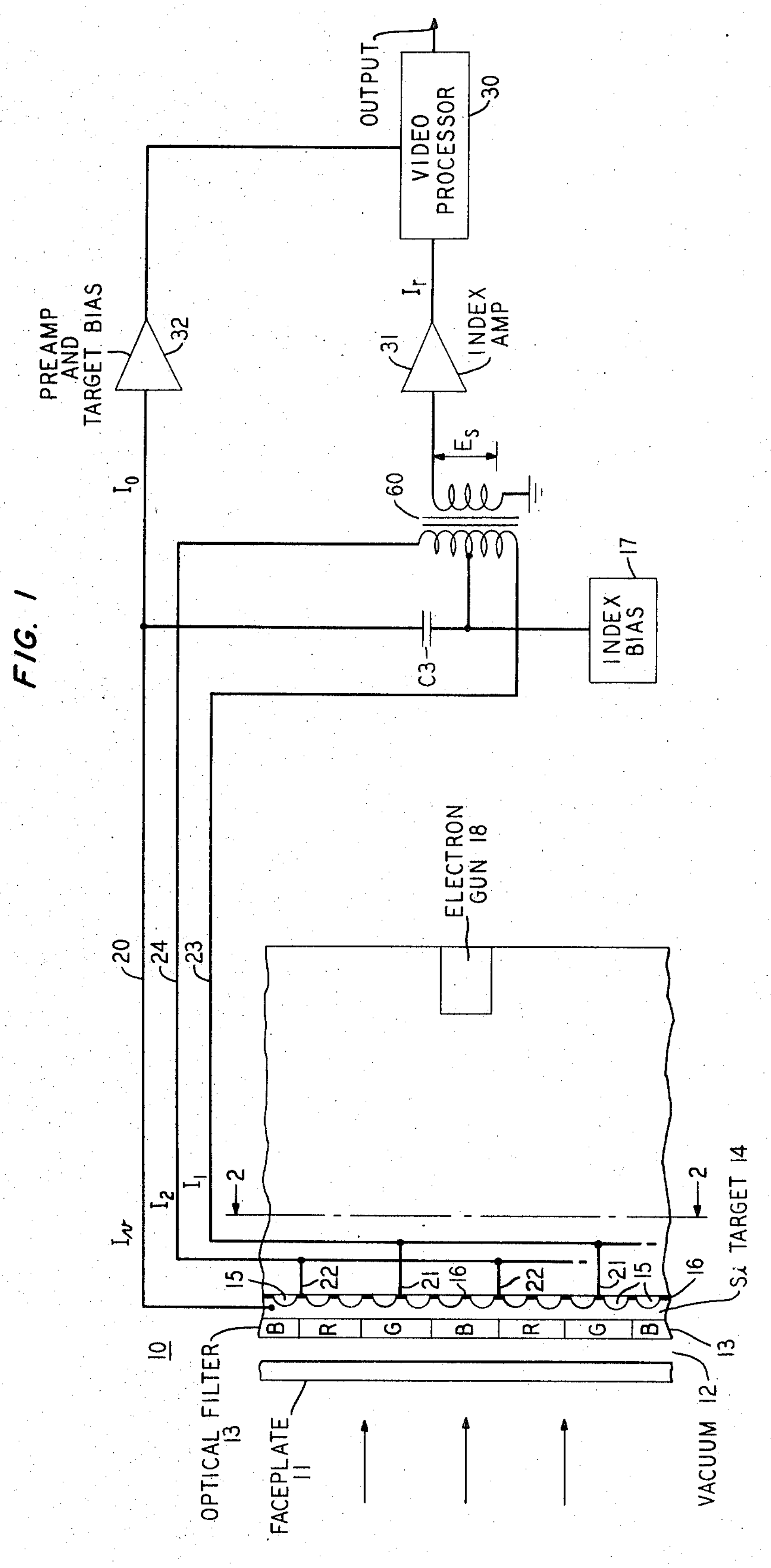
FIG. 1 is a block diagram of a color camera in accordance with the present invention showing in top view a portion of the interdigitated index structure in the tube target.

Camera pickup tube 10 in FIG. 1 is shown cut away to illustrate a top view of the target structure in accordance with the present invention. The light from the object scene passes through faceplate 11 into an evacuated region 12. The light is then filtered by grating 13 which includes spatially repetitive stripes of color filtering material. The grating is shown as having parallel triads of equal width primary color filter stripes of red, green and blue transmissivity, designated R, G and B, respectively, but as is well known, the stripes may be of other than primary colors and may be arranged other than in triads. In addition, the grating is not limited to equal width stripes. However, the invention is directed to an indexing technique to which the form of color filter 13 is irrelevant.

Target of tube 10 is formed on a unitary substrate 14 of silicon with an array of diodes 15 implanted on the interior side of the substrate. This side will be referred to hereinafter as the cathode side since it is facing the cathode of electron gun source 18 of the tube. The target substrate 14 is insulated from the electron beam by a thin insulating layer 16 of a material such as silicon dioxide. This target structure is fully described by M. H. Crowell and E. F. Labuda in the aforementioned article, and further detailed discussion of the structure and operation of the tube is unnecessary here. In summary, the color modulated light is focused on the target substrate 14 and the beam from source 18 scans the target and generates a video signal $I_v$ which represents the intensity of the light intercepting the target. This video signal is removed from tube 10 on lead 20 which is electrically connected to target substrate 14.

The signal $I_v$, which is a composite containing chrominance and luminance information, is applied to video processor 30 in which the chrominance signal is decoded and matrixed with the baseband luminance to produce an output suitable for transmission or image reconstruction. The chrominance decoding process, which may be by synchronous detection, will, of course, require phase information. This is provided by a reference signal $I_r$ created during the scanning process simultaneously with the generation of the video signal $I_v$.

Figure 2:
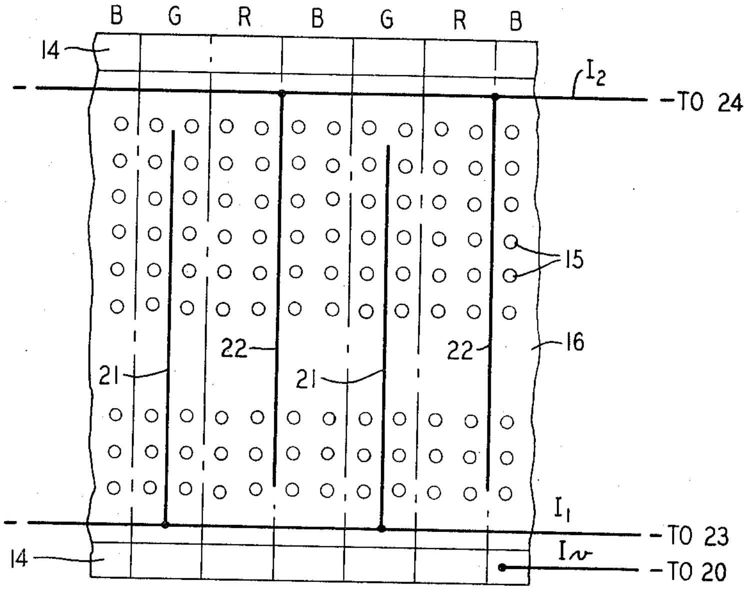
FIG. 2 is a view of the target portion of FIG. 1 as seen from the cathode along section 2—2.

The reference signal is the product of an index structure incorporated in the target. The structure consists of a series of vertical conducting strips or electrodes 21 having the same periodicity as the stripe sets of color grating 13 and aligned parallel to them. These conducting index strips are located on the cathode side of target 14 and are connected in common to lead 23. The strips may be applied in any convenient manner. One possible method is by metallization (or depositing metallic material) over the thin insulating layer 16 as illustrated in FIGS. 1 and 2, but numerous other possible fabrication techniques exist and these would be apparent to those skilled in the art. It is noted that critical tolerances must be satisfied when the electrode strips are positioned so that they are precisely aligned relative to the diode array and the color stripes.

Electrode strips 21 are dc biased by source 17 so as to be slightly positive relative to the cathode of gun 18. Thus, as the electron beam from the gun scans the target, it is intercepted by these positively biased strips 21 and results in the generation of an index signal current which appears on lead 23 as an accurate indicator of the beam position. A finely focused scanning beam will create an index signal as a series of pulses, but in a practical system only the fundamental sinusoidal component of the current is available.

The interconnected strips 21 act with unitary silicon target substrate 14 to form a capacitor. The coupling is approximately 100 pF per set of 100 strips (1 pF per half inch of strip length) for 3 micron wide, half-inch long metallization conductive electrodes on a one micron thick silicon dioxide insulation layer 16. The result of this capacitance is considerable coupling between strips 21 and target 14 and corresponding coupling of the index signal on lead 23 and the chrominance component of the video signal on video output lead 20. Since the two signals are at the same frequency any such coupling must be neutralized before processing in video processor 30 is effective.

The crosstalk which would result between this index signal and the video signal may be eliminated by use of a dual index structure on the target and a neutralizing transformer external to the tube. As illustrated in FIGS. 1 and 2, another set of index strips 22 is added to the series of strips 21, and in a manner similar to the interconnection of strips 21 all strips 22 are connected to a single external lead 24. Like strips 21, strips 22 are parallel to the color stripes of grating 13 and arranged with a periodicity equal to that of the color sets. The two sets of electrode strips are not electrically interconnected and thus form an interdigitated double comb structure. Strips 21 are shown positioned in the center of the green stripes and strips 22 are positioned at the blue-red boundary, but these locations are arbitrary; however, electrode strips 21 and 22 are preferably equally spaced from one another regardless of their position with respect to the color stripes.

Figure 3:
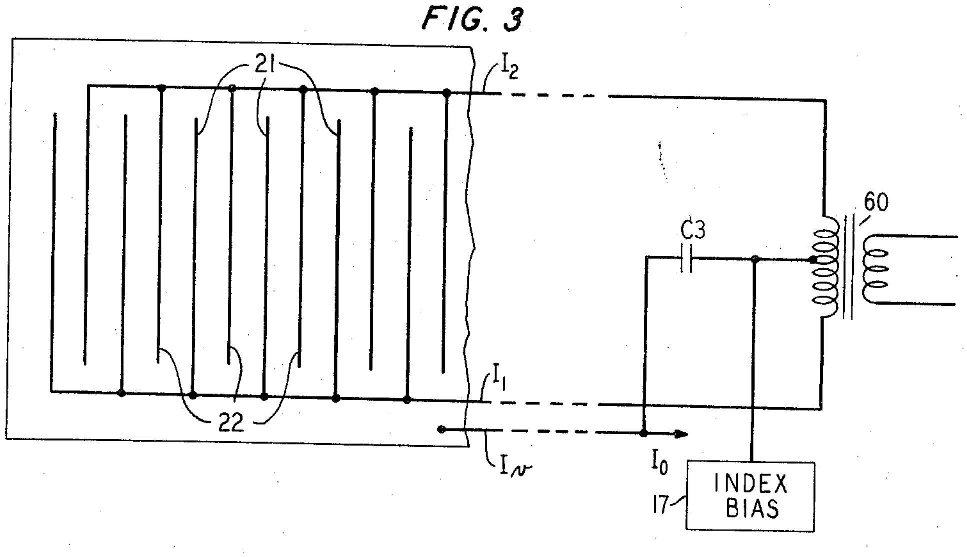
FIG. 3 is a schematic representation of the interdigitated index comb structure and the external neutralizing circuitry.
Figure 4:
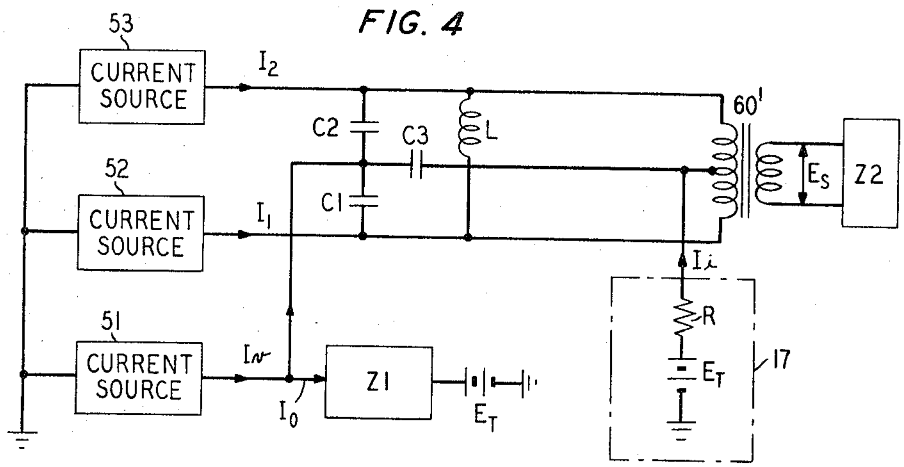
FIG. 4 is an equivalent circuit of the index comb structure and the external circuitry.

The three output leads, 20, 23 and 24 extend from pickup tube 10 and are applied as shown in FIG. 1 to external circuitry consisting of transformer 60, amplifiers 31 and 32, and processor 30. FIG. 3 is a schematic representation of the interdigitated index comb structure and the external neutralizing circuitry; FIG. 4 is a similar circuit in which the target structure has been represented by equivalent circuitry. The following analysis is made with reference to the circuit of FIG. 3 and its equivalent circuit in FIG. 4.

The video output lead 20 is connected to the center tap of the primary winding of transformer 60 and the index leads 23 and 24 are each connected to one of the ends of the primary winding. The transformer is designed to have low winding resistance and unity coupling between all windings, while preferably maintaining a very low capacitance between the primary and secondary. Inductor L represents the equivalent magnetizing inductance of transformer 60 and in FIG. 4 is shown separately from the transformer which is designated 60′ and considered "ideal."

As seen in FIG. 1 the video signal $I_v$ is applied to video preamplifier 32 and in FIG. 4 this signal $I_v$ is represented as being produced by current source 51. Sources 52 and 53 represent the production of $I_1$ and $I_2$, the index signals from the index combs formed by strips 21 and 22, respectively, and capacitors C1 and C2 represent the respective index electrode to target capacitance. Impedance 21 represents the input impedance of preamplifier 32 and it also includes all stray capacitance that appears between the target and ground. This capacitance is greater than is typically encountered in video preamplifiers because of the stray capacitance added by the transformer.

DC bias for the index electrode strips 21 and 22 required to attract the electrode beam is supplied by dc source 17 which applies a dc voltage $E_I$ through resistor R to the transformer primarily winding; the target bias is provided in a conventional manner by preamplifier 32 and is shown in FIG. 4 as its Thevinan equivalent of impedance Z1 and dc source $E_T$ in series. Capacitor C3 provides dc isolation for the index and target biasing voltages, but has negligible input impedance at the video frequencies.

Each of the comb structures generates the same frequency when scanned, but the two outputs are shifted in time by $1/(2f)$, where $f$ is the index frequency. Accordingly, their fundamental components are 180° out of phase. $I_1$, the output from the index comb formed by strips 21, can be represented by its Fourier series:

$$I_1(t) = B_0 + B_1 \sin \omega t + B_2 \sin (2\omega t + \beta_2) + \ldots \quad (1)$$

where $\omega$ is the fundamental index radian frequency, $2\pi f$, and $B_n$ and $\beta_n$, where $n = 0$ to $\infty$, are respectively the Fourier amplitude and phase coefficients. Similarly, the index signal $I_2$ generated by the interaction of the electron beam and the comb structure of strips 22 may be represented as $$I_2(t) = B_0 - B_1 \sin \omega t + B_2 \sin (2\omega t + \beta_2) - B_3 \sin (3\omega t + \beta_3) + \ldots \quad (2)$$

The effects of flyback have been ignored in Equations (1) and (2) since the components generated during flyback are removed from the video signal and thus the crosstalk generated in this interval is irrelevant to the indexing operation.

Analysis of the equivalent circuit of FIG. 4 indicates that the index potential $E_s$ appearing at the secondary of transformer 60′ is:

$$E_s = \frac{(N_2/N_1)(I_1 - I_2)}{\frac{(N_2/N_1)^2}{Z2} + j\omega\left(C1 + C2 - \frac{4}{\omega^2 L}\right)} \quad (3)$$

where $N_2/N_1$ is the ratio of turns on the secondary to the turns on each half of the primary of the transformer and $Z2$ is the impedance of the secondary load, index amplifier 31.

Accordingly, $$E_s = K\,[2B_1 \sin \omega t + 2B_3 \sin (3\omega t + \beta_3) + \ldots] \quad (4)$$

where $K$ is a constant determined by the circuit element values in Equation (3). It is noted that $E_s$ contains no component due to the video signal $I_v$ and hence the signal applied to index amplifier 31 and its output, reference signal $I_r$, contain no crosstalk from $I_v$. In contrast to conventional circuit balancing techniques, this elimination of the video signal components from the reference signal does not depend upon maintaining a balance between C1 and C2 (the capacitance associated with the combs formed by strips 21 and 22, respectively) or holding their values constant.

The action of the closely coupled halves of the primary winding of transformer 60 balances the signal appearing on lead 23 from strips 21 by inducing a signal of equal amplitude and opposite phase onto lead 24 which is connected to strips 22 and vice-versa, thus effectively neutralizing any capacitive coupling from index signals $I_1$ and $I_2$ to video signal $I_v$. Likewise, any potential appearing at the target 14 is coupled equally to the two comb structures and creates no potential difference across the transformer primary. Thus, the transformer secondary produces a reference signal which is unaffected by the video signal derived from the target.

By choosing L, the transformer primary inductance, to be parallel resonant with the index structure to target capacitances C1 and C2 at the index frequency $\omega$, the current through C1 and C2 is balanced with an out-of-phase current through inductor L and thus any loading effect of C1 and C2 on the reference signal current $I_r$, is avoided. $Z_2$, the input impedance of index amplifier 31, can be used for fine tuning and control of the $Q$ of the resonant circuit.

From the equivalent circuit of FIG. 4, $$I_1 + I_2 + I_v = I_0 - I_i \quad (5)$$

where $I_i$ is the current from index bias source 17 and $I_0$ is the current to preamplifier 32. $R$ is chosen to be $>>$ $Z1$ so that from Equations (1), (2) and (5)

$$I_{40} \approx I_v + 2B_2 \sin(2\omega t + \beta_2) + 2B_4 \sin(4\omega t + \beta_4) + \ldots \quad (6)$$

that is, the input current to video preamplifier 32 consists of the video signal $I_v$ plus the even harmonics of the sum of the internally generated index signals $I_1$ and $I_2$. However, these harmonics lie well above the video band and they will also be of relatively low amplitude because of the lower camera tube response at these higher frequencies.

The neutralizing action of the transformer is essential to the operation of the circuit and the high frequencies and low impedances involved make the design and construction of a suitable transformer relatively straightforward; and the use of alternative circuitry such as resistive loading followed by a differential amplifier, could not produce the same capacitance-insensitive separation of video and reference signals.

For completeness, it is noted that the circuit analysis also shows that the dc component of $I_i$, the index bias supply current, is $-2B_0$; that is, the index bias circuit 17 supplies the dc component of the index signals $I_1$ and $I_2$.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A color camera system comprising a target having a video output lead connected to the target, electron beam means for scanning the target, color filter means for forming a striped pattern of color components in periodically repetitive sets of color stripes on the target, a plurality of conductive index strips positioned on the target parallel to the color stripes and at half the period of the color sets, means for interconnecting alternate index strips to form a pair of interdigitated strip sets, a transformer having a center tapped primary winding and a secondary winding, said video output lead being connected to the center tap of the primary winding and each of said interdigitated pairs of conductors being connected to one of the ends of the primary winding, and an output utilization means connected to the secondary winding of the transformer.

2. A color camera system as claimed in claim 1 wherein said color filter means is arranged to produce on the target color stripe sets in triads of equal width colors.

3. A color camera system as claimed in claim 1 wherein said index strips are located on the cathode side of the target and insulated from the target.

4. A color camera system as claimed in claim 1 wherein said index strips are connected to bias means for applying a DC potential to the strips to maintain the strips slightly positive relative to the potential of the cathode of the electron beam means.

5. A color camera system as claimed in claim 1 wherein the strips of one of the interdigitated strip sets are equally spaced from both adjacent strips of the other of the interdigitated strip sets.

6. A color camera system as claimed in claim 1 wherein said target is formed by a diode array positioned on a substrate, said substrate being a unitary slab of material having high lateral conductivity.

7. A color camera system as claimed in claim 6 wherein said substrate is a unitary slab of silicon.

8. A color camera system comprising a target having a video output lead connected to the target, electron beam means for scanning the target, color filter means for forming a striped pattern of color components in periodically repetitive sets of color stripes on the target, a plurality of conductive index strips positioned on the target parallel to the color stripes and at half the period of the color sets, means for interconnecting alternate index strips to form a pair of interdigitated conductive strip sets, and means connected to the video output lead and to each of the interdigitated strip sets for neutralizing the capacitive coupling between the target and index strips by balancing the index signals produced by the scanning means on each of the interdigitated strip sets and for forming from the two index signals a reference signal indicative of the scanning beam position on the target and free of crosstalk from the signal produced by the scanning means on the video output lead.

9. A color camera system comprising a pickup tube having a target, color filter means for forming a striped pattern of color components in periodically repetitive sets of color stripes on the target, electron beam means for scanning the target, a first series of equally spaced and electrically interconnected conductive index strips positioned on the target parallel to the color stripes and having a period equal to the period of the color sets, and a second series of equally spaced and electrically interconnected conductive index strips positioned on the target parallel to the color stripes having a period equal to the period of the color sets and being electrically isolated from the first series of index strips; first and second index output leads connected respectively to the first and second interconnected series of index strips; a video output lead connected to the target; means connected to the video output lead and the first and second index output leads for neutralizing the capacitive coupling between the target and the index strips by balancing the index signals produced by the scanning means on each of the index output leads by inducing a signal of equal amplitude and opposite phase on the other index output lead and for forming from the two index signals a reference signal indicative of the scanning beam position on the target; and means for utilizing the reference signal to process the signal produced by the scanning means on the video output lead.

10. A color camera system as claimed in claim 9 wherein said neutralization and forming means is a transformer, the video output lead is connected to a center tap of the primary winding, the first and second index output leads are each connected to one of the ends of the primary winding, and said utilization means is connected to the secondary winding of the transformer.

11. A color camera system as claimed in claim 9 wherein said first and second series of conductive strips are arranged in an interdigitated fashion such that each strip of the first series which is positioned between strips of the second series is spaced equally from both adjacent strips of the second series.

12. A color camera system of the type having a target, color filter means for forming a striped pattern of color components in periodically repetitive color stripes on the target, a video output lead connected to the target, electron beam means for scanning the target and for forming on said video output lead a signal representative of the image formed on the target, a series of conductive strips positioned on the target for forming a reference signal indicative of the scanning beam position, and means for utilizing the reference signal to decode the representative video signal, characterized in that said series of conductive strips are arranged parallel to the color stripes and at half the period of the color stripes and alternate index strips are interconnected to form a pair of interdigitated conductive index strip sets, each of the index strip sets is connected to opposite ends of a transformer primary having a center tap connected to the video output lead, and the secondary of the transformer is connected to the utilization means.

* * * * *